US011640349B2

United States Patent
Ho et al.

(10) Patent No.: US 11,640,349 B2
(45) Date of Patent: *May 2, 2023

(54) REAL TIME APPLICATION ERROR IDENTIFICATION AND MITIGATION

(71) Applicant: PAYPAL, INC., San Jose, CA (US)

(72) Inventors: Chun Kiat Ho, Singapore (SG); Harsha Singalreddy, Singapore (SG); Xin Wu, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,812

(22) Filed: Apr. 12, 2021

(65) Prior Publication Data

US 2021/0279164 A1    Sep. 9, 2021

Related U.S. Application Data

(63) Continuation of application No. 16/227,729, filed on Dec. 20, 2018, now Pat. No. 10,977,162.

(51) Int. Cl.
    *G06F 11/36*    (2006.01)
    *G06F 11/34*    (2006.01)

(52) U.S. Cl.
    CPC ...... *G06F 11/3664* (2013.01); *G06F 11/3457* (2013.01); *G06F 11/3476* (2013.01);
    (Continued)

(58) Field of Classification Search
    CPC ............. G06F 11/3476; G06F 11/3457; G06F 2201/875; G06F 11/3664; G06F 11/3696; G06F 11/3636; G06F 2201/81
    See application file for complete search history.

(56) References Cited

U.S. PATENT DOCUMENTS 6,760,903 B1   7/2004   Morshed et al.
7,359,831 B2   4/2008   Shrivastava et al.
(Continued)

FOREIGN PATENT DOCUMENTS

EP    3899717 A1    10/2021
WO    2020132620 A1   6/2020

OTHER PUBLICATIONS

U.S. International Searching Authority, PCT Notification of Transmittal of the International Search Report and the Written Opinion of the International Searching Authority, or the Declaration, for International Application No. PCT/US2019/068129 dated Mar. 10, 2020, 11 pages, Commissioner for Patents, Alexandria, VA.

(Continued)

*Primary Examiner* — Marina Lee
(74) *Attorney, Agent, or Firm* — Haynes and Boone, LLP

(57) ABSTRACT

A method may be performed by a network server and includes: applying historical raw user data as an input to a first application running in a simulation environment; receiving activity log entries from the first application in the simulation environment; identifying a first group of the activity log entries corresponding to an error of the first application; saving an error entry in non-volatile storage media in response to identifying the first group of the activity log entries, the error entry including the first group of the activity log entries and an identification of action to be taken in response to the error of the first application; and causing a monitoring system to generate a first alert corresponding to the error entry.

20 Claims, 7 Drawing Sheets

(52) U.S. Cl.
CPC ...... *G06F 11/3636* (2013.01); *G06F 11/3696* (2013.01); *G06F 2201/875* (2013.01)

(56) References Cited

U.S. PATENT DOCUMENTS

| | | | |
|---|---|---|---|
| 9,600,393 | B2 | 3/2017 | Golde et al. |
| 10,977,162 | B2 * | 4/2021 | Ho ..................... G06F 11/3664 |
| 2006/0200450 | A1 | 9/2006 | Keane et al. |
| 2009/0089761 | A1 | 4/2009 | Lazzaro et al. |
| 2009/0138861 | A1 | 5/2009 | Terpolilli |
| 2010/0250478 | A1 * | 9/2010 | Chen ....................... G09B 7/02 715/702 |
| 2011/0107308 | A1 * | 5/2011 | Cooper ............... G06F 11/3644 717/127 |
| 2013/0014107 | A1 * | 1/2013 | Kirchhofer ........... G06F 9/5083 718/1 |
| 2014/0207935 | A1 * | 7/2014 | Gopshtein ............... H04L 43/50 709/224 |
| 2014/0325487 | A1 | 10/2014 | Maczuba |
| 2016/0019134 | A1 * | 1/2016 | Periyasamy ........ G06F 11/3664 714/38.1 |
| 2016/0019229 | A1 * | 1/2016 | Athale .................. G06F 16/958 709/217 |
| 2016/0283348 | A1 | 9/2016 | Golde et al. |
| 2019/0129827 | A1 | 5/2019 | Ramasamy et al. |
| 2019/0141383 | A1 | 5/2019 | Kageyama et al. |
| 2020/0099773 | A1 | 3/2020 | Myers et al. |
| 2020/0201744 | A1 | 6/2020 | Ho et al. |

OTHER PUBLICATIONS

International Appl. No. PCT/US2019/68129, International Search Report and Written Opinion dated Mar. 10, 2020, 11 pages.
Australian Patent Application No. 2019403474, Australian Intellectual Property Office, Examination search report, dated Apr. 8, 2022, 3 pages.

* cited by examiner

REAL TIME APPLICATION ERROR IDENTIFICATION AND MITIGATION

PRIORITY DATE

This is a continuation application of U.S. application Ser. No. 16/227,729, filed Dec. 20, 2018, now issued as U.S. Pat. No. 10,977,162, the disclosure of which is hereby incorporated in its entirety.

BACKGROUND

Field of the Invention

The present disclosure generally relates to application error detection and, more specifically, to software application error identification and remedial action.

Related Art

Web-accessible applications are becoming ubiquitous and are increasing in sophistication every year. For instance, setting up a financial account in past years might have required a consumer to walk into a brick-and-mortar bank branch. However, today a consumer may set up a financial account using a web application of a financial institution or payment service provider.

Some industries, such as financial services, may be subject to strict government regulation and also have little tolerance for web application downtime, where web application downtime may translate to lost revenue. Accordingly, web applications for such industries may include a multitude of advanced features, where many of those advanced features may directly tie into revenue for the company and be designed to comply with legal standards. Therefore, such industries may perform extensive testing before making an application publicly available and may have developers on staff who are responsible for addressing errors in the web applications.

Current systems for testing web applications and addressing errors in the web applications can be inadequate. For instance, some web applications may be tested using data specifically designed for testing, though that data may or may not be indicative of real-world use and may not be comprehensive as to errors that may be experienced. Furthermore, there may be a time lag between when a user of a web application experiences an error and a time that the developer team is alerted to the error. That delay may be in some instances hours, days, or even weeks.

It would be desirable to have a technological solution that may provide techniques to identify more errors during testing and to increase the speed and efficiency of remedial action in response to errors identified in live applications.

Figure 1:
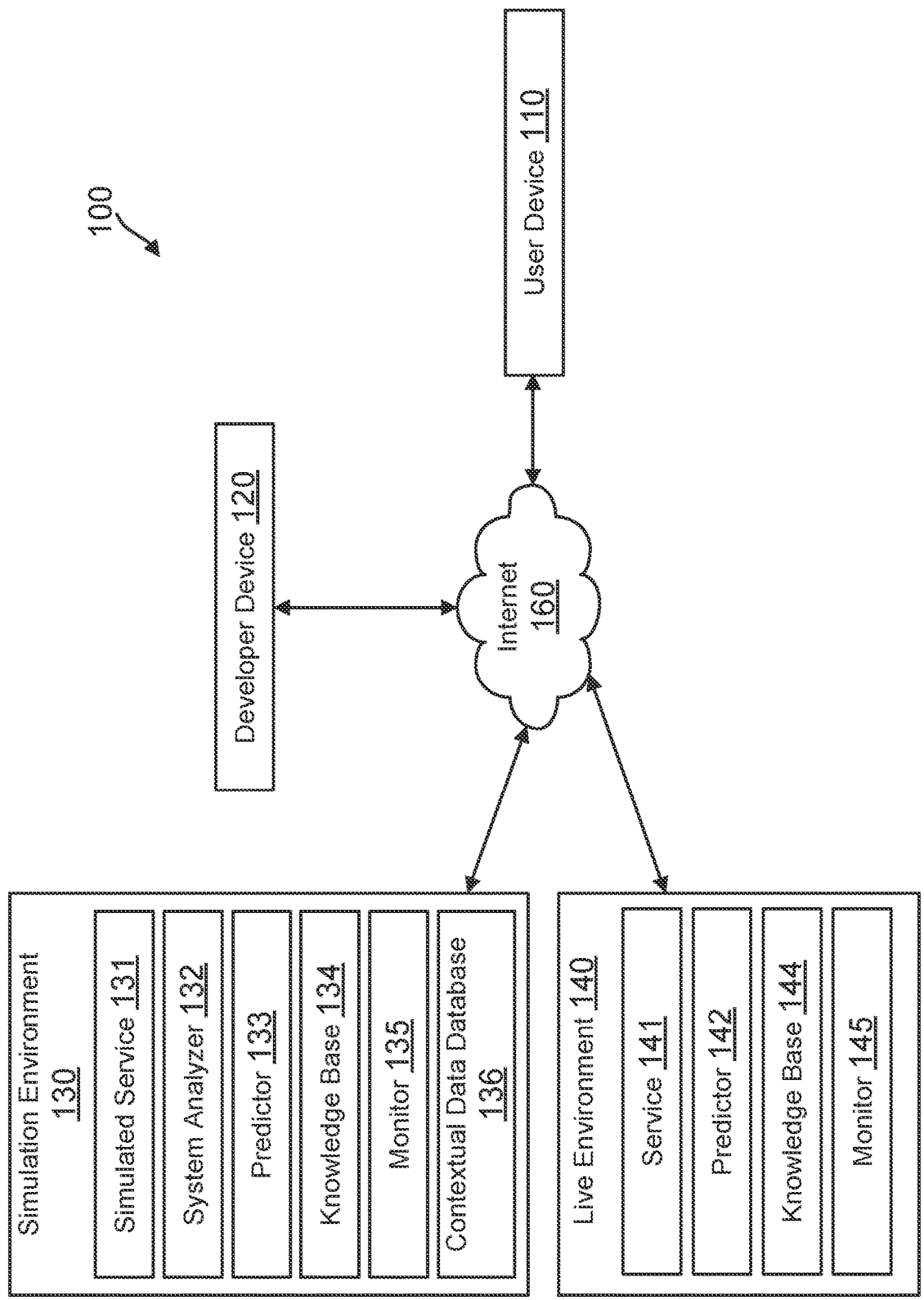
FIG. 1 is block diagram of a networked system suitable for use with application error detection and remediation according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments provide for techniques to identify errors during a testing phase of an application and also during operation of the application in a live environment. Various embodiments may also provide efficient actions and alerts in response to detection of errors.

In one example, an application is run in a simulation of the live environment, i.e., a simulation environment. In this example, the simulation environment may be structured so that developers have access to the simulation environment, but the application is not live or otherwise presented to end-users. Further in this example, the input to the application in the simulation environment includes historical raw user data. Examples of historical raw user data may include data that has been entered by real end-users for prior versions of the application or for other similar applications. For instance, historical raw user data may include names entered by end-users as they fill out fields in an online application, addresses, personal and financial information, and the like. Furthermore, a database of the historical raw user data may be quite large so that it may represent a significant number of end user accesses expected to cause errors.

For instance, in one example it may be expected that an online application would crash once per every 10,000 real-world user accesses. By contrast, the database of historical raw user data may include enough user data to represent at least one order of magnitude greater than that (e.g., three orders of magnitude greater or 10 million real-world user accesses). Of course, the database of historical raw user data may be any appropriate size or scope and is not limited to these examples.

Continuing with the example, the simulation environment may use that historical raw user data as an input to the application, and the application generates activity log entries as it runs. The log entries in this example provide a record for each action performed by the application. Some of the log entries may indicate abnormalities of different severity. For instance, some abnormalities of lesser severity may be labeled "debug" in its respective log entry, whereas abnormalities of greater severity may be labeled "error" or "fatal" in their respective log entries. Of course, those are just examples of error categories, and various embodiments may use any appropriate collection of error categories to describe abnormalities indicated by the log entries.

Further in this example, a system analyzer may examine the log entries to identify application errors, e.g., errors in a web application, a mobile application, a desktop application, a backend service, and the like. For instance, the system analyzer may be set to examine log entries that are associated with abnormalities of the greater severity (e.g., "error" or worse) and to identify unique errors in those activity log entries. For instance, when examining the log entries, the system analyzer may come across 1000 errors, but 500 of those errors may actually represent the same unique error occurring repeatedly. The system analyzer may parse the log entries and then use the parsed information to correlate groups of the log entries that correspond to the same errors.

Continuing with this example, the system analyzer may be in communication with a knowledge base or database that includes a multitude of error entries. For each of the unique errors identified by the system analyzer, the system analyzer checks the knowledge base for one of those errors that are already identified in the knowledge base. For those already known errors, the system analyzer may simply discard them as they are already included in the knowledge base. For each new error, the system analyzer may create a new entry in the knowledge base, where the entry includes a group of the activity log entries corresponding to a respective error, and identification of the error, and information regarding remedial action for that error.

The simulation environment may also include an error predictor, which has access to the knowledge base. As the error predictor operates, it accesses the knowledge base and takes appropriate action based on those errors that are identified. For instance, it may cause a monitoring system to generate alerts for each of the error entries, where the monitoring system is in communication with the developer team to alert the developer team of the errors. The developer team may then review the alerts and correct errors as appropriate before running the application in a user-facing live environment.

Various embodiments allow for using the output of the error predictor to fix errors not only in the code of the application in the simulation environment but in the code of other applications which may be in development or may be live. For instance, many of the applications of that developer team may use the same or similar portions of code so that an error affecting a portion of code in the application in the simulation environment would be expected to affect another application using the same portion of code. The developer team may take this into account in fixing those errors in the other applications as well.

Of note in this example is that the developer team may decide to fix some errors by fixing a portion of code, whereas other errors may be treated a different way. For instance, a known error might arise when the application cannot access a particular database. The remedial action indicated in the error entry in the knowledge base may then direct the developer team to restart the database when that error is seen. However, the developer team may not have a code fix for that particular error. In any event, some errors may be expected to pop up from time to time as the application operates in a live environment.

Thus, the error predictor may also operate in the live environment and monitor activity logs from one or multiple applications as they are presented to end-users in real time. As the error predictor operates, it examines the activity log entries of the live applications against entries in the knowledge base and when it encounters an error, it takes action according to the corresponding entry in the knowledge base (e.g., send alerts to developer team).

Various embodiments may provide one or more advantages. For instance, various embodiments identify unique errors and save them to the knowledge base with notes indicating actions to take, such as alerting the developer team or automatically fixing an error. Those unique errors may be identified from simulation with a large database of historical raw user data. While it would be expected that no testing regimen would ever identify one-hundred percent of possible errors that might occur in real-world use, the size of the database and nature of the historical raw user data may be more comprehensive in the numbers of unique errors that can be identified.

Additionally, creation of the knowledge base itself provides the advantage of recording those known errors along with actions to be taken. An error predictor may then operate in communication with the knowledge base to identify errors from simulation and live operation and take appropriate action. The error predictor in combination with the knowledge base may provide much faster feedback than would be expected in a more manual process in which the developer team may be apprised of an error through a reactive system or from a system based on human end-user feedback. Additional advantages are described further below with respect to various use cases.

FIG. 1 is a block diagram of a networked system suitable for error detection and correction according to an embodiment. A networked system 100 may comprise or implement a plurality of servers and/or software components that operate to perform various services. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a simulation environment 130 and a live environment 140, both of which may be run or hosted by or part of one or more servers. System 100 also includes a developer device 120 and a user device 110, and each of the different environments/servers 130, 140 and the devices 110, 120 are in communication with a network 160. For instance, the user device may access a service 141 over network 160, and the developer device 120 may access the live environment 140 and simulation environment 130 over network 160 as well.

The servers may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

Devices 110 and 120 are associated with a user and a developer, respectively. In various embodiments, the user is a human end-user who may access the service 141 in the live environment 140 perform any of a variety of actions, such as creating an account, updating an account, transferring money, making a purchase, and the like. In various embodiments, the developer may be a human user as well, though the developer may be a person responsible for maintaining a variety of applications (or services), including writing and editing code for the applications.

User device 110 and developer device 120 may be implemented using any appropriate hardware and software configured for wired and/or wireless communication over network 160. For example, in one embodiment, each of devices 110, 120 may be implemented as a personal computer (PC), a smart watch, a smart phone, a smart phone with additional hardware such as NFC chips, BLE hardware etc., wearable devices with similar hardware configurations such as a gaming device, a virtual reality headset, or that talk to a smart phone with unique hardware configurations and running appropriate software, laptop computer, and/or other types of computing devices capable of transmitting and/or receiving data, such as an iPad™ from Apple™.

Looking to simulation environment 130, it was introduced above as being part of or run/hosted by one or more servers. In some embodiments, the simulation environment 130 may include a group of servers arranged as a map reduce system, where an example of a map reduce system includes Hadoop™ from Apache Software Foundation. For instance, a simulated service 131, a system analyzer 132, a predictor 133, and a knowledge base 134 may be implemented on a plurality of distributed servers and distributed storage to process and generate big data sets using a distributed algorithm. Of course, the simulation environment 130 may be implemented using any number of computing devices as appropriate and is not limited to a map reduce system and is not limited to big data sets.

Continuing with this example, the simulation environment 130 includes simulated service 131, which is a service running in the simulation environment 130. For instance, the simulated service 131 may include an application executed within the simulation environment and using historical raw user data from contextual data database 136 as its input. The simulation environment 130 is not exposed externally, so that user device 110 does not have access to simulation environment 130. By contrast in this example, the developer device 120 may interact with the simulation environment 130 over network 160 to supervise the simulation of various services and the operation of the system analyzer 132, predictor 133, and a monitor 135.

The contextual data database 136 may include user data from past end-user interactions in the live environment 140. In one example, services may run in the live environment and be user-facing so that a multitude of end users (e.g., such as associated with user device 110) may interact with the services to set up accounts, make purchases, transfer money, update personal information or preferences, and the like. Over time and through interactions of multiple services with thousands or millions of users, the data entered by the users may be saved to the contextual data database 136.

One example use case includes a live application that has interactive fields that request user addresses. Over time users may interact with it and enter in their address information. The example application may save those addresses into a database (not shown) in the case of successful data entry. However, if the user enters an incorrect address and goes back to change it, some example systems might delete the incorrect data and replace it with the corrected data with no record saved of the incorrect data. By contrast, various embodiments of the present disclosure save the data into the contextual data database 136 during the user interactions, regardless of whether the data is later changed. Thus, the contextual data database 136 may include data that is representative of both correct and incorrect entries.

In one example, most users would be expected to have a single address, whereas other users might have two or three addresses that they would enter into the system. However, out of thousands of users that may interact with the application, there may be one user who has 100 addresses and causes the application to crash by entering those 100 addresses. For instance, the amount of address information may use substantially all the processing and memory resources of the server on which the application is running, thereby causing the web application to freeze or shut down. Continuing with this example, the contextual data database 136 may save those addresses as entered by the user, even though the 100 addresses may not be successfully entered into the application.

In another example, a user may be filling out a form requesting address or name information and may enter a character that is unrecognizable by the application. For instance, an ASCII character included in an Arabic-language address may not be accommodated by the application so that when the user enters that character it causes the application to experience a malfunction and, perhaps, a crash. Once again, even though that address may not be stored in the database intended to be used for business purposes, that entry of an illegal, unrecognizable, or non-conforming character may still be saved as historical raw user data in the contextual data database 136. Therefore, the historical raw user data in the contextual data database 136 may include data indicative of ordinary user interactions as well as more extreme examples of user interaction that may be expected to cause errors in a real-life application.

Continuing with the example, the simulation environment 130 executes the simulated service 131 using the historical raw user data as an input. An example of a simulated service 131 may include a new release of an existing application, a new application, or any application that may be in development. In this example, the simulated service 131 represents an application that is being tested with the intent that at least some of its errors may be discovered and corrected before it goes live in the live environment 140.

In various embodiments, as the simulated service 131 executes, it generates a multitude of activity log entries. An example of an activity log includes a log generated using Composite Application Logging (CAL) techniques. Activity log entries are discussed in more detail with respect to FIG. 2. The system analyzer 132 receives those activity log entries and examines them for errors. As noted above, the activity log entries may indicate error categories, with some of the categories being more serious than other ones of the categories. A developer may configure the system analyzer to omit consideration of those activity log entries with lesser error categories in order to reduce the number of errors that are identified and saved to the knowledge base 134. For instance, a developer may determine to omit consideration of abnormalities less serious than "error" or "fatal" so that only the most serious abnormalities are addressed through the system by alerts or other action. This may be a value judgment on the part of the developers, who may have limited resources and may determine that abnormalities of lesser degree (e.g., "debug") may be ignored at least for the purposes of the present system. Of course, other developers may set a threshold for error category to be lower in order to be over inclusive of abnormalities as a result of having more resources or a perceived high importance of the particular application.

Figure 2:
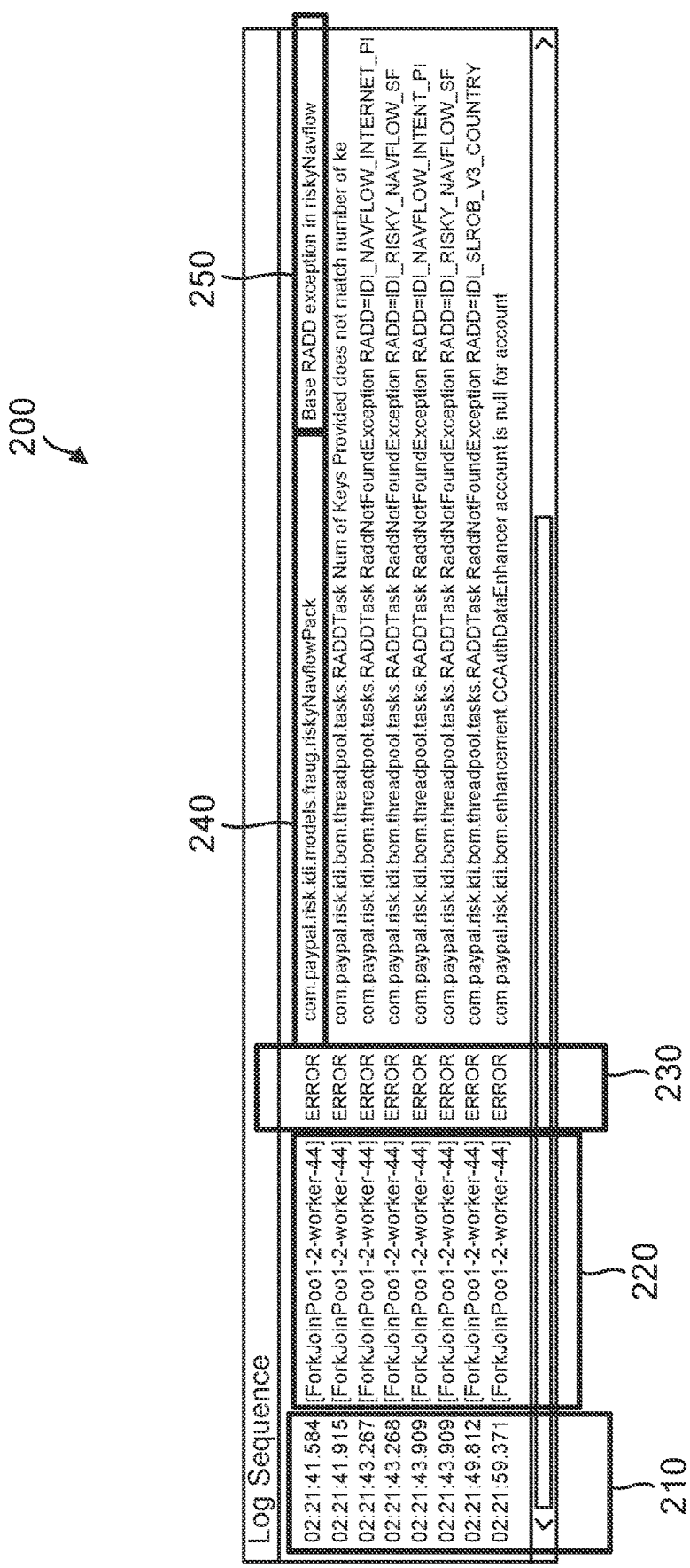
FIG. 2 is an illustration of an example log sequence, according to one embodiment.

FIG. 2 shows an example log sequence 200, according to one embodiment. The log sequence 200 may be generated by the simulated service 131 as it executes in the simulation environment 130. For instance, log sequence 200 includes eight activity log entries, each with its own time stamp 210. Each of the activity log entries also provides an indication 220 of a thread. Each process can have multiple threads, and indication 220 indicates a particular thread id. Regarding the process itself, process information can be obtained by, for example, using the location of the log in identifying the service/process which is producing the log. The process information itself may be obtained in other ways. For example, in some cases, the service or process can be identified from the location and name of the logs. Error categories 230 are also indicated in each of the activity log sequences. As noted above, there may be a multitude of different error categories, each one with a different level of severity. In some examples, categories may include fatal, error, warn, information, and debug. The activity log entries in sequence 200 all indicate "error", and it is understood that sequence 200 is an example and other sequences of log entries generated by simulated service 131 may be associated with no error category (in the instance of no abnormality) or categories other than "error."

Each of the activity log entries in sequence 200 also includes an indication of a code point 240 associated with the action. In the case that a given activity log entry may be associated with an abnormality, then the code point may be associated with the abnormality as well. Item 250 is a short description of the abnormality.

Returning to FIG. 1, the simulated service 131 generates activity log entries, which are received by the system analyzer 132. The system analyzer 132 examines the activity log entries for errors. In one example, the system analyzer 132 performs a correlation analysis on the activity log entries for those activity log entries that have an error category above a threshold (e.g., "error"). The correlation analysis may determine similarities among the different activity log entries and group them together as a unique error based on the similarities. In the example of FIG. 2, the log sequence has been grouped by the correlation algorithm due to those log entries having a same error category 230 and being associated with a same thread 220 and related code points 240 as well as close-in-time timestamps 210. In this manner, the system analyzer 132 has identified the abnormalities associated with the log sequence 200 as a unique error.

In a given simulation session, the simulated service 131 may experience a same abnormality multiple times so that the log sequence 200 of FIG. 2 may be repeated multiple times (but with different timestamps) within the totality of the log entries generated during the simulation session. In this example, the system analyzer 132 recognizes the pattern of the same activity, error category, code points, and abnormality description in similar sequences of the logs and recognizes that those other log sequences are associated with the same unique error. The system analyzer 132 may perform this analysis over the totality of the activity logs to group different log sequences according to unique errors.

Of course, other embodiments may perform the correlation in a different way. For instance, other embodiments may generate activity logs that have items different than those illustrated in FIG. 2 at 210-250. In such instances, those other embodiments may perform the correlation operation in a similar manner—that is, by recognizing that groups of entries may repeat substantially the same content but with different times. Furthermore, as noted above, the correlation operation may omit from the process those activity log entries that have an error category below the set threshold (e.g., "error"), so that the pattern recognition is performed only for those activity log entries at or above the threshold.

Moreover, the correlation algorithm may consider the full number, or fewer than the full number, of items presented in the activity logs as appropriate to a given system. As an example above, it was noted that the correlation algorithm may discount timestamps for the purpose of identifying the same error occurring at different times. However, other embodiments may take into account the timestamps in an example in which it is expected that an error might be associated with a particular time (e.g., a time when databases are being backed up and might be unavailable, etc.). Also, the correlation algorithm may place different weights on different items in the activity log entries. For example, some systems may place less weight on the error description 250 so that log sequences having similar items 220-240 but having differences in error description 250 may still be grouped into a unique error. Of course, error description 250 is just one example of a portion of an entry that may be weighted, and it is noted that various embodiments may weight any log entry portion as appropriate for a given system.

For each unique error, the system analyzer 132 may consult the knowledge base 134 by using any of the items 220-250 as a search index through the activity log entries stored in the knowledge base 134. By performing the search, the system analyzer 132 may determine that the identified error from the log sequence 200 is a known error that is already recorded in an error entry within the knowledge base 134. In such instance, the system analyzer 132 may then decline to save the particular log sequence with the knowledge base 134 and move to a next log sequence.

However, in an instance in which the system analyzer 132 searches the saved activity log entries in knowledge base 134 and does not find the same or similar log entries already stored within the knowledge base 134, then the system analyzer 132 has identified a new unique error. Continuing with the example, the system analyzer may cause the monitor 135 to generate an alert for input for a developer. The developer receives the alert at developer device 120, and the developer may review the log sequence and use her expertise to determine a remedial action (e.g., alert developer, fix automatically, take no action, etc.) and to cause the system analyzer 132 to save the log sequence as an error in a knowledge base entry. Of course, various embodiments may seek to minimize manual oversight by a developer by automatically generating similar error entries in the knowledge base for errors similar to those already stored in knowledge base 134. For instance, some examples may have preprogrammed templates that can be accessed and applied to unique errors that are discovered. In an example in which a database being unavailable would be expected to cause errors having a recognizable error description (e.g., error description 250 of FIG. 2), the system analyzer may be programmed to recognize the error description 250 (or other portion of an activity log entry) and to apply one of the preprogrammed templates in response to recognizing the particular portion of the activity log entry.

Figure 3:
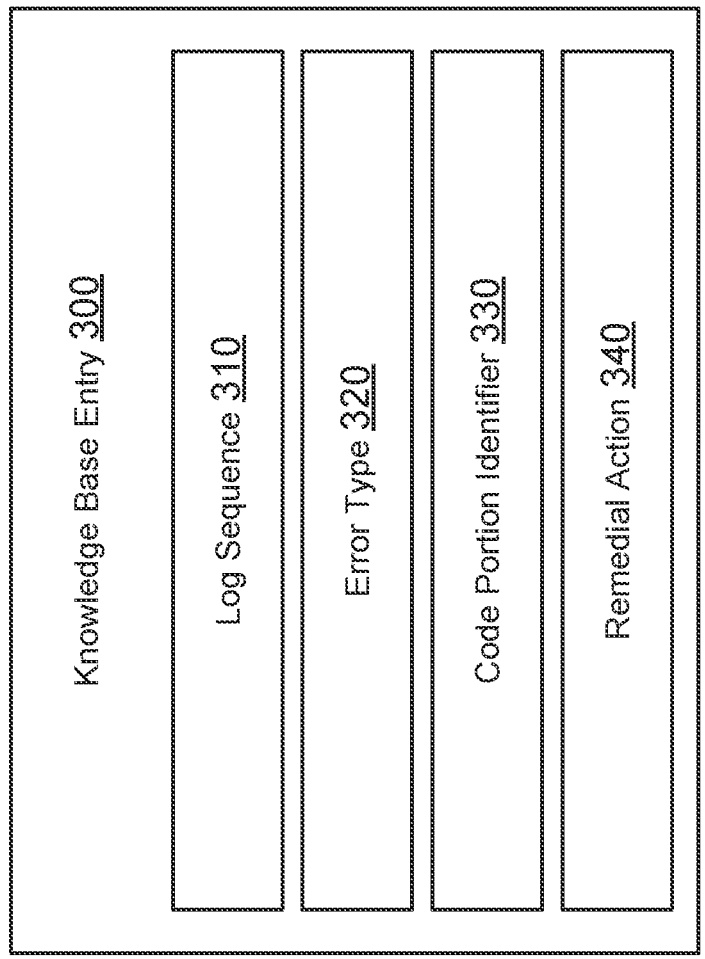
FIG. 3 is an illustration of an example error entry in the knowledge base of FIG. 1, according to one embodiment.

FIG. 3 is an illustration of example knowledge base entry 300, according to one embodiment. Knowledge base entry 300 is an illustration of one example entry in the knowledge base 134, and it is understood that in various embodiments the knowledge base 134 may include hundreds, thousands, or millions of entries similar to example knowledge base entry 300, each of the entries indicating a unique error. The knowledge base 134 may be stored in nonvolatile memory either in the simulation environment 130 or elsewhere.

Further, the knowledge base 134 may be organized as a database or as some other structure, e.g., a collection of files.

Knowledge base entry 300 includes a log sequence 310. An example of a log sequence includes log sequence 200 of FIG. 2. Put another way, each of the knowledge base entries includes at least one activity log entry. Knowledge base entry 300 also includes an indication of an error type 320. Error type 320 may include any appropriate indication, whether embodied as plain language or selected from a menu of different types. In one example, the error type 320 may include information the same as or similar to the error description 250 of FIG. 2. In some examples, the error type 320 may be entered by a developer as a response to an alert from the system analyzer 132.

Furthermore, the example knowledge base entry 300 may also include a code portion identifier 330. As noted above, a log sequence may also include an indication of code portion (e.g., item 240 of FIG. 2). The code portion identifier 330 in the knowledge base entry 300 may include further information, such as an identifier of the particular code portion as it may be referenced in a code library or open source resource (e.g., its reference identifier in GitHub™). The code portion identifier 330 may be entered manually by a developer or automatically by the system analyzer, assuming the system analyzer has a cross reference between the code portion identifier 240 of FIG. 2 and another code library reference.

Knowledge base entry 300 may also include a section 340 for indicating remedial action. For instance, knowledge base entry 300 may include an indication of what causes the specific error, how to recover from the error (if possible), and specific actions to be taken (if any) within section 340. In one example, if a particular error associated with knowledge base entry 300 is caused by a database being unavailable to the application, then the section 340 may store information noting that the error is caused by database unavailability as well as indicating that the database may be restarted to correct the error. Furthermore, section 340 may also include instructions to cause the monitor 135 to generate an alert to a responsible developer team, where the alert may include some or all of the information from section 340. In other words, the alert may include the indication of the cause of the error, how to recover from the error, and specific actions to be taken. Information in section 340 may be entered manually by a developer, when creating the error entry, or automatically by the system analyzer 132.

Other examples may include an error caused by specific code portion, and the alert may apprise the responsible developer team of the particular code point causing the error, using the information from code portion identifier 330. Other example actions may be suggested as part of an alert that includes restarting the service. Furthermore, in some embodiments, the remedial action from section 340 may be implemented automatically through the predictor 133. For example, an action such as restarting a database, restarting the application, or even applying a fix to a particular code portion may in some instances be applied automatically by the predictor 133. However, some developer teams may prefer that at least some actions go through a human filter first so that human discretion can determine whether to take the particular action.

Moving to the predictor 133, it also runs within the simulation environment 130 in this example (it also runs within the live environment 140, as described in more detail below). As described above, the system analyzer 132 analyzes the activity log entries, recognizes unique errors within the entries, and stores new unique errors in the knowledge base as error entries. By contrast, the predictor 133 analyzes the activity log entries against the error entries in the knowledge base 134 and takes particular actions in response to identifying errors from the knowledge base 134.

The predictor 133 may be in communication with the simulated service 131 and receive the activity log entries therefrom. In some embodiments, the predictor 133 may run after the system analyzer 132 has created new error entries for the knowledge base 134 so that the predictor 133 may reference the activity log entries against a more updated collection of knowledge base entries. In other embodiments, the predictor 133 may run at the same time as the system analyzer 132 runs. In any event, the predictor 133 may receive the activity log entries from the simulated service 131 and correlate entries in the activity log to error entries in the knowledge base 134. For instance, as noted above, knowledge base entries may include log sequences associated with known errors. The predictor 133 may compare the received activity log entries to the stored activity log entries in the knowledge base. As it performs the comparing, the predictor 133 may identify similarities between activity log entries from the simulated service 131 and log sequences stored in various knowledge base entries.

For instance, with respect to FIG. 2, similar errors may be expected to generate similar activity log entries, such as shown in items 220-250. In some instances, the predictor 133 may use items 220-250 from a received activity log and compare them to the activity logs in the log sequences in the error entries. If the predictor 133 identifies a same or similar activity log entry as one stored in an error entry of the knowledge base, then it may determine that the activity log entry is an indicator of the known error of the error entry. The predictor may then parse the error entry to determine remedial action to be taken. As noted above, the remedial action may include sending alerts to responsible developer team members and automatically fixing errors.

Looking now to the live environment 140, it may include one or more servers, such as Web servers, which present service 141 to the public, and the public may interact with service 141. Service 141 may be the same as, or different from, the simulated service 131. However, in many embodiments, a particular service will be simulated and improved by the developer team using the errors identified from the predictor 133 before moving a particular service to the live environment 140. Of note in the live environment 140 is that the input to the service 141 may include actual live input, as compared to the simulation environment that uses contextual information for the simulation. In other words, in the live environment, the service 141 may interact with actual end users, such as a user at user device 110.

Live environment 140 also includes a predictor 142. Predictor 142 may operate similarly to predictor 133. Specifically, as a service 141 is run in the live environment, it generates activity log entries, and the predictor 142 receives those activity log entries. The predictor 142 compares those activity log entries to the activity log entries stored in the error entries of a knowledge base 144 and may identify when one of the activity log entries corresponds to an error stored in the knowledge base 144. The predictor 142 may then parse the particular knowledge base entry to determine a remedial action and then to act upon the remedial action by, e.g., causing a monitor 145 to send an alert to the developer team or correcting the error itself.

In this example, knowledge base 144 is shown in live environment 140, whereas knowledge base 134 is shown in the simulation environment 130. However, the scope of embodiments may include both the simulation environment 130 and the live environment 140 sharing a same knowledge base. The same may be true of the monitors 135 and 145, where they may be duplicated in the simulation environment 130 and the live environment 140 or may be shared between those environments 130, 140.

Figure 4:
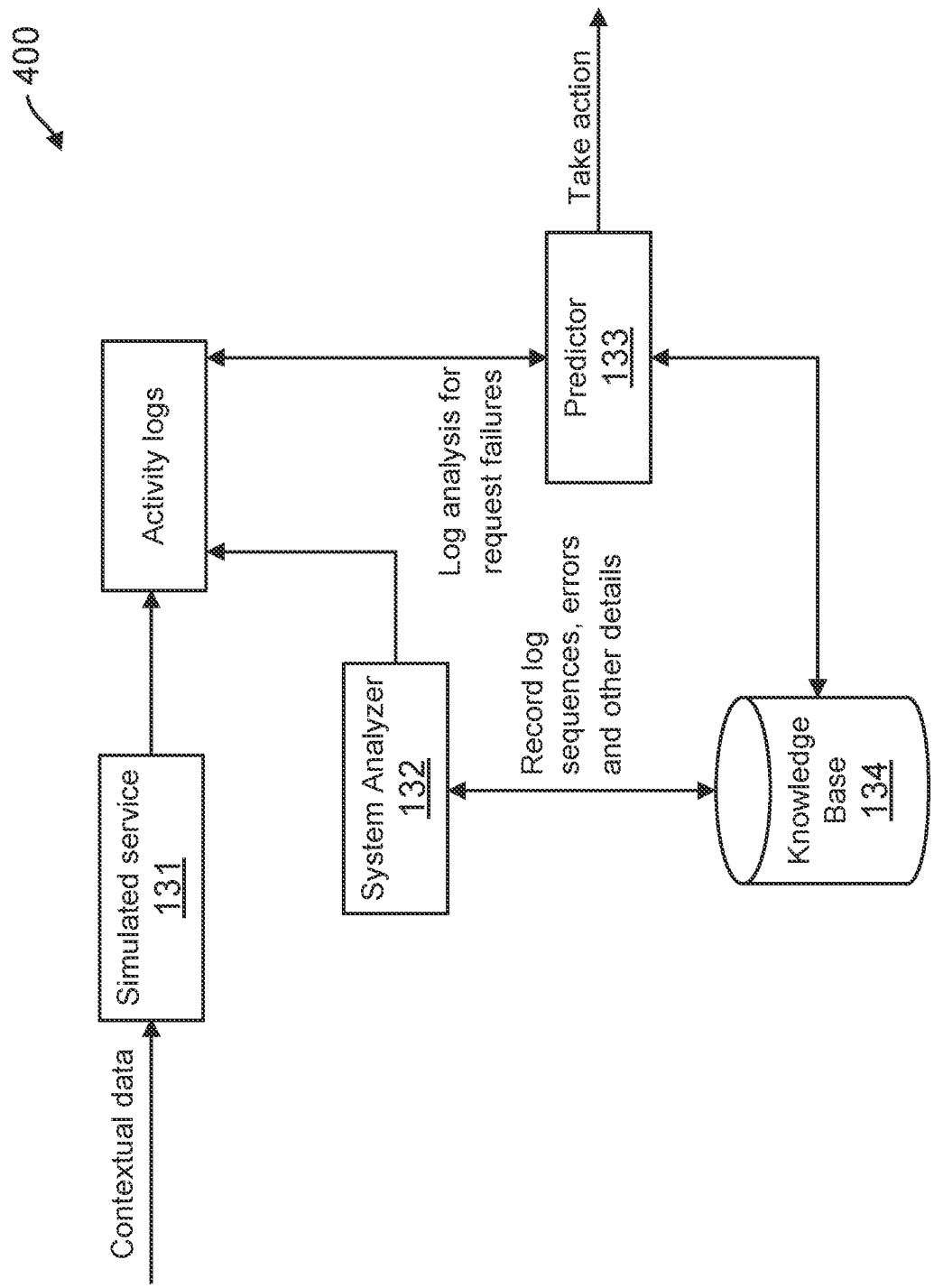
FIG. 4 is an illustration of an architecture implementing the system analyzer and predictor in a simulation environment according to one embodiment.

FIG. 4 is an illustration of an architecture 400 for the simulation environment 130 of FIG. 1, according to one embodiment. In the simulation environment, contextual data, including historical raw user data, is input to the simulated service 131. The simulated service 131 generates activity logs, which are analyzed by the system analyzer 132. As described above with respect to FIG. 1, the system analyzer 132 identifies unique errors within the activity logs, and when it discovers a unique error that is not already represented within the knowledge base 134, the system analyzer 132 saves a new error entry to the knowledge base 134 for that new error. As time goes on, the system analyzer 132 builds a collection of known errors, each of the known errors being associated with an error entry in the knowledge base 134.

Continuing with the example of FIG. 4, the predictor 133 may also operate within the simulation environment by analyzing the activity logs and matching activity log entries to activity log entries that are saved in error entries in the knowledge base. When the predictor 133 finds a match between an activity log entry and a log sequence in an error entry, the predictor 133 then parses the error entry to determine appropriate actions to take in response to the error. For instance, the predictor 133 may cause a monitor to send an alert to a responsible developer team or may take action on its own.

In one example, the predictor 133 may identify an error in the activity logs, and in accordance with remedial action indicated in a corresponding error entry, may send an alert to the developer team identifying a code portion indicated in the error entry. Furthermore, the predictor 133 may in some examples modify the code in response to remedial action indicated in the corresponding error entry. For instance, the predictor may modify code in the service that was simulated. Moreover, that particular code portion may be referenced in a library and may be used across multiple applications. In that case, the predictor may also send alerts notifying the responsible developer team of the error in those other applications and, in some instances, may also modify the code in those other applications automatically. Thus, the example architecture 400 shows the predictor 133 providing feedback by taking actions based on observed errors.

Figure 5:
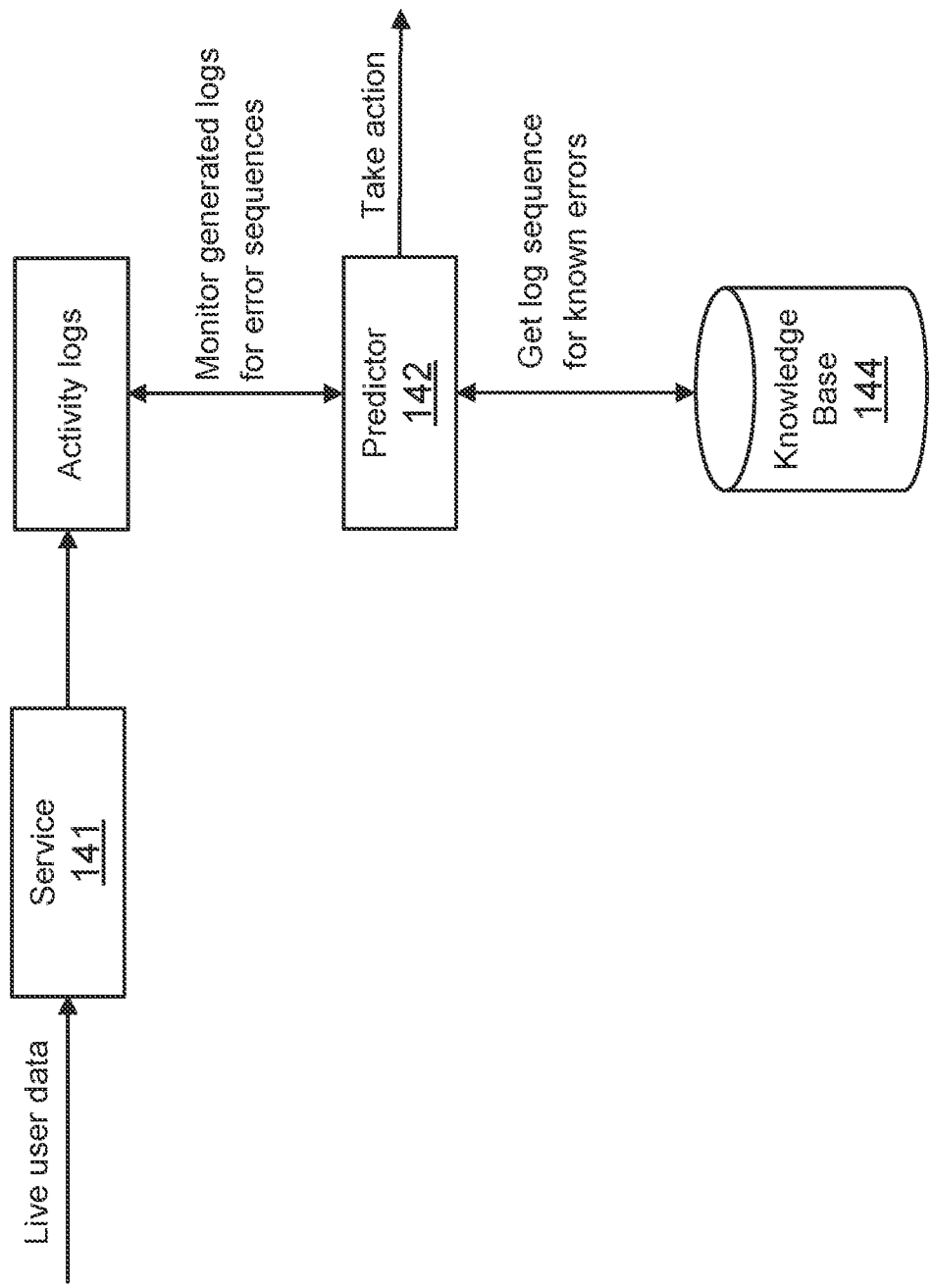
FIG. 5 is an illustration of an architecture implementing the predictor and knowledge base in a live environment, according to one embodiment.

FIG. 5 is an illustration of an architecture 500 for the live environment 140 of FIG. 1, according to one embodiment. In contrast to the simulation environment, the live environment includes live user data being an input to the service 141. As it operates, the service 141 generates activity logs. The predictor 142 operates similarly to the predictor 133 by matching activity logs to errors in the knowledge base 144 and taking actions indicated by corresponding error entries in the knowledge base 144.

In one example use case, the predictor 142 may identify an error in the activity logs, and in accordance with remedial action indicated in a corresponding error entry, may send an alert to the developer team or automatically take other action itself, such as modifying code. In some instances, the predictor 142 may determine from an error entry that an alert should be sent to the developer team. Accordingly, this may happen immediately following the end user experiencing the error and may even be perceived as being in real time by the developer team. Thus, some embodiments may provide the advantage of transmitting alerts to the responsible developer team more quickly than would a system that relies on manual feedback from the end user reporting the error. Also, when the error is associated with a portion of code that is used in other applications, the alert may spur the developer team to modify the code in those other applications, in some instances the predictor 142 may itself modify code in those other applications if indicated in the remedial actions in the knowledge base 144. Thus, the example architecture 500 shows the predictor 142 providing feedback by taking actions based on observed errors in the live environment.

Figure 6:
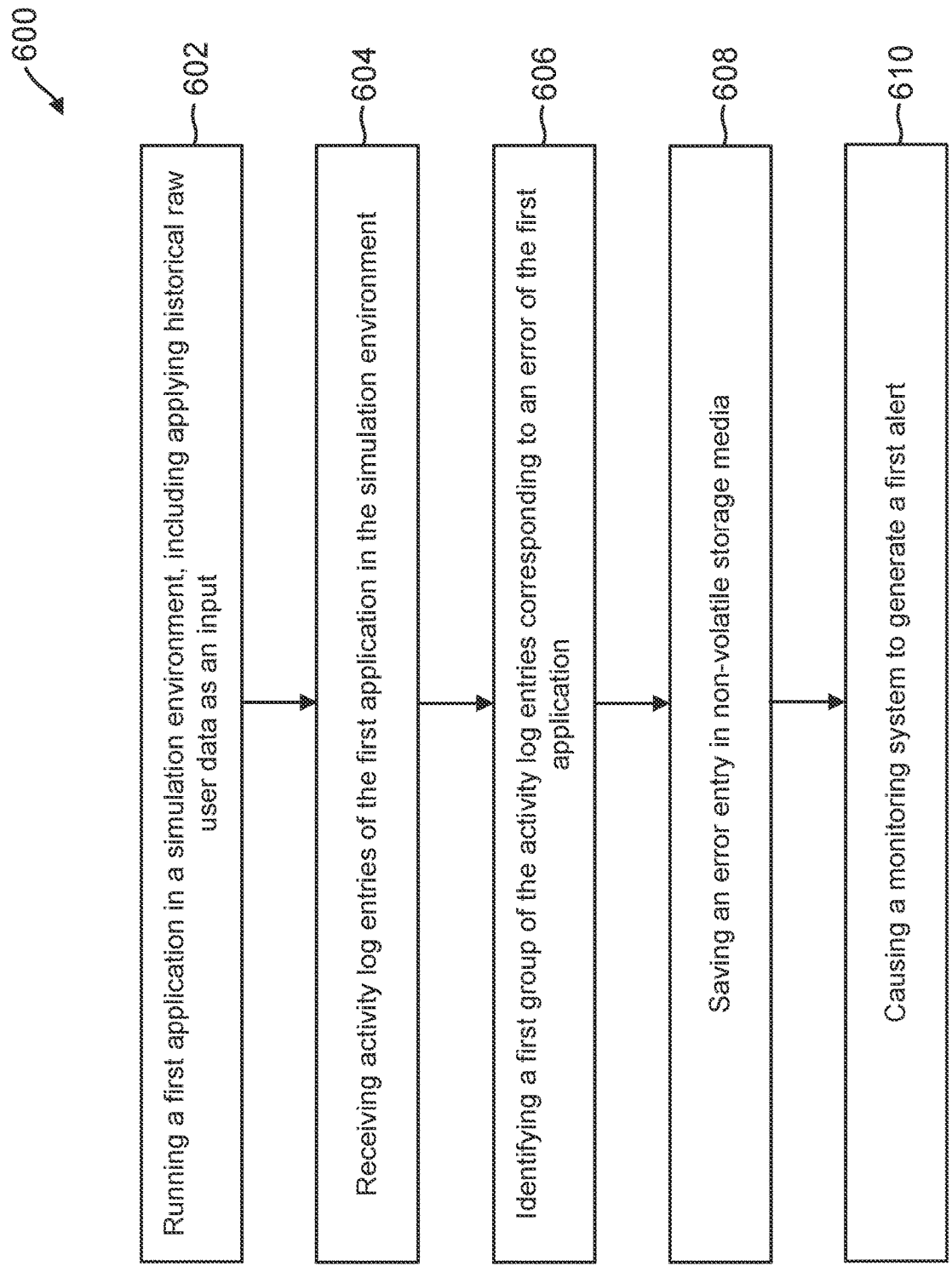
FIG. 6 is an illustration of an example method for creating the knowledge base and taking remedial action, according to one embodiment.

FIG. 6 is an illustration of example method 600 for identifying application errors, according to one embodiment. Method 600 may be performed by a server (or servers, as in simulation environment 130), specifically, by one or more processors as they execute computer code to provide functionality described herein.

At action 602, a first application is run in a simulation environment. For example, action 602 may include applying historical raw user data as an input to the first application in the simulation environment. In some examples, as described above with respect to FIG. 1, the historical raw user data may include a voluminous amount of data corresponding to thousands, or millions, or billions of user interactions. Thus, in some examples the simulation environment may include a distributed system specifically designed for use with big data, such as a map reduce system. However, various embodiments may even perform the simulation with a single server or something between a single server and a larger map reduce system. Action 602 may further include the first application generating activity log entries as it operates, where some of those activity log entries may have an indication of an error category (e.g., fatal, error, etc.).

Action 604 may include receiving the activity log entries of the first application. In the examples of FIGS. 1 and 4, the system analyzer 132 receives the activity log entries from the simulated service 131. The system analyzer 132 then performs analysis on the activity log entries, at action 606.

At action 606, a first group of the activity log entries is identified as corresponding to an error of the first application. As an example, the system analyzer 132 of FIGS. 1 and 4 may analyze the activity log entries and determine that a member of a group of activity log entries indicates an error category that is equal to or greater than a threshold level of error category (e.g., at least as severe as "error"). In response to that, the system analyzer may determine that the group of activity log entries matches a second group of activity log entries generated by the first activity log. For instance, the system analyzer may identify similarities between each group of the activity log entries with respect to items within those activity log entries, such as identification of a process or an identification of a code piece. Based on that matching, the system analyzer may determine that both groups of activity log entries correspond to a single unique error. In a case in which the unique error is a new error or otherwise not represented in the knowledge base, then the system analyzer may move to action 608.

At action 608, the system analyzer saves the error entry in nonvolatile storage media, such as a hard disk drives or solid-state drives and in an appropriate format, such as a database. An example error entry is described above with respect to FIG. 3.

Method 600 may also include action 610, which includes causing a monitoring system to generate a first alert. For instance, a predictor running within the simulation environment may generate an alert in response to an error entry in the knowledge base specifying that the alert should be generated.

The scope of embodiments is not limited to the particular series of actions depicted in FIG. 6. Rather, various embodiments may add, omit, rearrange, or modify the actions. For instance, various embodiments may include additional actions by a predictor in the simulation environment. In one example, the predictor in the simulation environment may analyze an error entry corresponding to an error in the activity logs in the simulated environment. The predictor may perform an action automatically (e.g., modifying code, restarting the application, restarting a database that supplies the application with data, restarting another resource) or may send an alert to a responsible developer team.

The scope of embodiments may further include a process used by the predictor, whether in the live environment or the simulated environment, to identify an error. For instance, the predictor may correlate an activity log entry to an error entry in the knowledge base. The correlating may include comparing the activity log entry to a group of activity log entries, such as a log sequence, determining a similarity between the activity log entry and at least one activity log entry in the group of activity log entries (e.g., error category, process, code portion, etc.) and then identifying that the activity log entry corresponds to the error in response to the comparing.

Various embodiments may provide benefits over existing systems. For instance, over time, the knowledge base may expand to include a wide variety of known errors, and the historical raw user data may comprehensively represent known troublesome interactions. Therefore, simulation using the historical raw user data and the knowledge base to identify errors in the simulated application may be more trustworthy. Specifically, it may be expected that the simulation would identify a larger number of errors than would existing systems, thereby allowing the responsible developer team to modify the code. This may allow an application to withstand auditing, such as the strict auditing that financial institutions are subject to. The knowledge base may be shared within a company or even among companies to help identify errors in a wide variety of applications during development.

Various embodiments may also use the predictor to alert the developer team to errors and even fix the errors in some instances. As shown above with respect to FIGS. 4 and 5, the predictors may be arranged in a feedback loop so that feedback is provided to the responsible developer team as soon as an error is discovered by the predictor. This may provide advantages in real world systems. In one use case example, a deficiency in the code of an application may provide an opening that malicious users may exploit to enter incorrect information or otherwise get past a risk filter. If that deficiency is discovered in another application using a same code portion, then the predictor may alert to the developer team of the problem, perhaps before malicious users discover the deficiency.

The predictor may provide feedback more quickly to a responsible developer team than would other existing systems. For instance, an existing system may rely on user feedback (e.g., a user complaint) to make its way back to the developer team through manual channels. By contrast, the predictor may notice an error in real time and alert the responsible developer team immediately thereafter. In some examples, the predictor may even take action itself by restarting a database, restarting an application, or modifying code, if appropriate.

Figure 7:
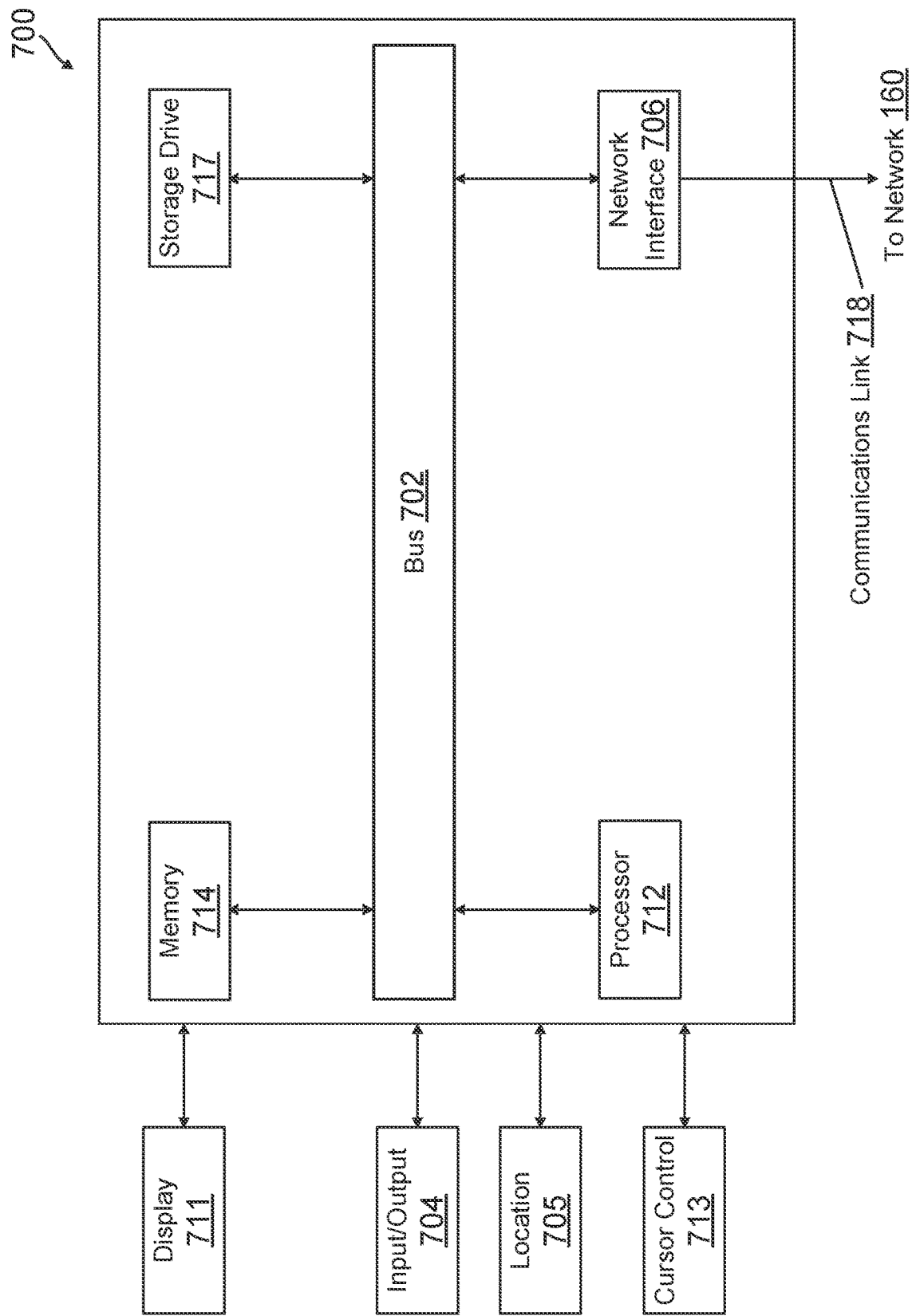
FIG. 7 is a block diagram of a computer system suitable for implementing one or more components in FIG. 1 according to one embodiment.

FIG. 7 is an illustration of an example embodiment of a computer system 700 suitable for implementing, for example, the computing devices 110, 120, and the servers in simulation environment 130 and live environment 140 of FIG. 1 discussed above. It should be appreciated that other devices utilized in the system discussed above may be implemented as the computer system 700 in a manner as follows.

In accordance with various embodiments of the present disclosure, computer system 700, such as a smart phone, computer, and/or a network server, includes a bus 702 or other communication mechanism for communicating information, which interconnects subsystems and components, such as a processing component 712 (e.g., processor, microcontroller, digital signal processor (DSP), etc.), a system memory component 714 (e.g., RAM) a storage drive component 717 (e.g., solid-state, hard drive, or optical), a network interface component 706 (e.g., wireless card, modem, or Ethernet card), a display component 711 (e.g., a touchscreen, CRT, or LCD), an input/output component 704 (e.g., keyboard, keypad, a touchscreen), a cursor control component 713 (e.g., mouse, pointer, or trackball), and/or a location determination component 705 (e.g., a Global Positioning System (GPS) device as illustrated, a cell tower triangulation device, and/or a variety of other location determination devices known in the art). In one implementation, the storage drive component 717 may comprise a database having one or more storage drive components.

In accordance with embodiments of the present disclosure, the computer system 700 performs specific operations by the processor 712 executing one or more sequences of instructions contained in the memory component 714, such as described herein with respect to FIGS. 1-6 discussed above. Such instructions may be read into the system memory component 714 from another computer readable medium, such as storage drive 717. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 712 for execution. Such a medium may take many forms, including but not limited to, non-volatile media and volatile media. In various implementations, non-volatile media includes hard drive or solid-state drives, such as the storage drive component 717, and volatile media includes dynamic memory, such as the system memory component 714. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of the computer systems 700 coupled by a communication link 718 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 700 may transmit and receive messages, data, information and instructions, including one or more programs (i.e., application code) through the communication link 718 and the network interface component 706. The network interface component 706 may include an antenna, either separate or integrated, to enable transmission and reception via the communication link 718. Received program code may be executed by processor 712 as received and/or stored in storage drive component 717 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    one or more processors; and
    one or more machine-readable storage media having instructions stored thereon that, in response to being executed by the one or more processors, cause the system to:
        access historical user data of users of a second application, wherein the historical user data was obtained based on entries from the users while the second application was running in a live environment;
        apply the historical user data as an input to a first application running in a non-live environment;
        receive activity log entries from the first application in the non-live environment;
        identify a first group of the activity log entries corresponding to an error of the first application;
        store an error entry in non-volatile storage media in response to identifying the first group of the activity log entries, the error entry including the first group of the activity log entries and an identification of an action to be taken in response to the error of the first application; and
        cause a monitoring system to provide a feedback to an entity, the feedback comprising an alert corresponding to the error entry, the alert indicating a portion of a computer code in the first application that caused the error.

2. The system of claim 1, wherein the second application is a previously released version of the first application.

3. The system of claim 1, wherein executing the instructions further causes the system to:
    transmit, a corrective action to the first application in response to the error and action identified.

4. The system of claim 1, wherein executing the instructions further causes the system to:
    analyze the activity log entries, wherein the analyzing includes determining if the log entries indicate an error category, and wherein the error category is determined based on a threshold level being met.

5. The system of claim 4, wherein the error category includes at least one of a code error, a malicious activity, or a complaint from the users.

6. The system of claim 1, wherein the non-live environment includes a simulation environment in which the first application is simulated without being presented to users of the first application.

7. The system of claim 1, wherein the historical user data includes data supplied by the users via interactive fields of the second application.

8. A method comprising:
    accessing historical user data of one or more users of a second application, wherein the historical user data was obtained based on entries from the one or more users while the second application was running in a live environment;
    applying the historical user data as an input to a first application running in a non-live environment;
    receiving activity log entries from the first application in the non-live environment;
    identifying a first group of the activity log entries corresponding to an error of the first application;
    storing an error entry associated with the error, the error entry including the first group of the activity log entries and an identification of an action to be taken based on the error of the first application; and
    causing a monitoring system to generate an alert corresponding to the error entry, the alert including a cause of the error of the first application and a corrective action to take to recover from the error of the first application.

9. The method of claim 8, wherein the second application is a previously released version of the first application.

10. The method of claim 8, further comprising:
    transmitting, the corrective action to the first application in response to the error and action identified.

11. The method of claim 8, further comprising:
    analyzing the activity log entries, wherein the analyzing includes determining if the log entries indicate an error category, and wherein the error category is determined based on a threshold level being met.

12. The method of claim 11, wherein the error category includes at least one of a code error, a malicious activity, or a complaint from the one or more users.

13. The method of claim 8, wherein the non-live environment includes a simulation environment in which the first application is simulated without being presented to one or more users of the first application.

14. The method of claim 8, wherein the historical user data includes data supplied by the one or more users via interactive fields of the second application.

15. A non-transitory machine-readable medium having stored thereon machine-readable instructions executable to cause a machine to perform operations comprising:

accessing historical user data of at least one user of a second application, wherein the historical user data includes input from the at least one user while the second application was running in a live environment;

applying the historical user data as an input to a first application running in a non-live environment;

receiving activity log entries from the first application in the non-live environment;

identifying a first group of the activity log entries corresponding to an error of the first application;

storing an error entry associated with the error in non-volatile storage media based on the identifying, the error entry including the first group of the activity log entries and an identification of an action to be taken in response to the error of the first application; and causing a monitoring system to provide a feedback, to an entity, with respect to the error entry, the feedback including one or more preprogrammed templates that can be applied to the first application to cure the error.

16. The non-transitory machine-readable medium of claim 15, wherein the second application is a previously released version of the first application.

17. The non-transitory machine-readable medium of claim 15, further comprising:

transmitting, a corrective action to the first application in response to the error and action identified, the corrective action including an application of at least one of the preprogrammed templates.

18. The non-transitory machine-readable medium of claim 15, further comprising:

analyzing the activity log entries, wherein the analyzing includes determining if the log entries indicate an error category, and wherein the error category is determined based on a threshold level being met.

19. The non-transitory machine-readable medium of claim 18, wherein the error category includes at least one of a code error, a malicious activity, or a complaint from the at least one user.

20. The non-transitory machine-readable medium of claim 15, wherein the non-live environment includes a simulation environment in which the first application is simulated without being presented to at least one user of the first application.

* * * * *